United States Patent [19]
König et al.

[11] Patent Number: 5,961,408
[45] Date of Patent: Oct. 5, 1999

[54] DEVICE FOR CONTROLLING A CVT

[75] Inventors: Hubert König, Tettnang; Hans Peter Stoll, Oberteuringen; Ralf Vorndran, Bodolz, all of Germany

[73] Assignee: ZF Friedrichshafen AG, Friedrichshafen, Germany

[21] Appl. No.: 08/809,219

[22] PCT Filed: Oct. 10, 1995

[86] PCT No.: PCT/EP95/03977

§ 371 Date: Mar. 18, 1997

§ 102(e) Date: Mar. 18, 1997

[87] PCT Pub. No.: WO96/12126

PCT Pub. Date: Apr. 25, 1996

[30] Foreign Application Priority Data

Oct. 13, 1994 [DE] Germany ............... 44 36 506

[51] Int. Cl.⁶ ................. F16H 59/00; F16H 9/18
[52] U.S. Cl. ................. 474/18; 474/28; 474/29
[58] Field of Search ................. 474/8, 17, 18, 474/28, 29, 30

[56] References Cited

U.S. PATENT DOCUMENTS

| | | | |
|---|---|---|---|
| 4,584,909 | 4/1986 | Abo et al. | 474/29 |
| 4,714,451 | 12/1987 | Yoshiida et al. | 474/29 |
| 5,201,687 | 4/1993 | Friedmann | 474/18 |
| 5,203,233 | 4/1993 | Hattori et al. | 474/18 |
| 5,222,417 | 6/1993 | Sato | 474/18 |
| 5,232,406 | 8/1993 | Sato | 474/18 |
| 5,263,387 | 11/1993 | Reniers | 474/18 |
| 5,295,915 | 3/1994 | Friedmann | 474/18 |
| 5,334,102 | 8/1994 | Sato | 474/18 |

FOREIGN PATENT DOCUMENTS

| | | |
|---|---|---|
| 0158370 | 1/1985 | European Pat. Off. |
| 0 487 129 A1 | 5/1992 | European Pat. Off. |
| 0 487 134 A1 | 5/1992 | European Pat. Off. |
| 0 498 210 A1 | 8/1992 | European Pat. Off. |
| 0 621 421 A1 | 10/1994 | European Pat. Off. |
| 42 34 103 A1 | 4/1993 | Germany |

*Primary Examiner*—John A. Jeffery
*Assistant Examiner*—Matthew A. Kaness
*Attorney, Agent, or Firm*—Davis and Bujold

[57] ABSTRACT

The proposal is for a device for controlling a CVT (3) driven by a drive unit (1) in which an emergency running unit is activated on the breakdown of the electronic control device (15). It sets a constant compression or power ratio between the primary (S1) and secondary (S2) pulleys.

13 Claims, 3 Drawing Sheets

DEVICE FOR CONTROLLING A CVT

According to the preamble of claim 1, the invention concerns a device for controlling a continuously variable transmission (CVT) driven by a drive unit.

BACKGROUND OF THE INVENTION

Continuously variable transmissions, hereinafter called CVT, have a first pair of cone pulleys upon an input shaft and a second pair of cone pulleys upon an output shaft. Each pair of cone pulleys comprises a first pulley stationary in axial direction and a second pulley movable in axial direction, hereinafter called respectively primary pulleys and secondary pulleys. Between the pairs of cone pulleys extends a belt-drive organ such as a sliding band. The primary pulley and secondary pulley are each adjusted by a pressure medium. For that purpose an electronic control device controls the pressure level of the adjustment spaces of primary pulley and secondary pulley via the electromagnetic actuators and hydraulic valves.

DE-OS 42 34 103 has disclosed an apparatus for control of the pressure of the primary pulley. The device comprises an electromagnetically controlled primary valve and a hydraulic secondary valve. The primary valve is controlled by an electronic control device. In case of line disconnection of the electronic control device to the primary valve, the device passes to emergency running. The pressure level of the primary pulley is determined here by the secondary valve. The position of the secondary valve is, in turn, adjusted by a mechanical coupling of the primary pulley. The device has the disadvantage of not coping with the complete breakdown of the electronic control device.

SUMMARY OF THE INVENTION

The problem to be solved by the invention is to provide a device for emergency running of a CVT. According to the invention the problem is solved by the fact that in case of breakdown of the electronic control device, an emergency running unit is activated by an adjusting means with a constant compression ratio or power ratio of the primary pulley to the secondary pulley. The pressure level in the adjustment space of the secondary pulley remains constant. It is possible to establish the magnitude of the change of ratio of the CVT from normal operation to emergency running by the amount of said power ratio. The solution proposed by the invention thus offers the advantage of a safe transition from normal operation to emergency running. Overspeed or too sharp a reduction of the speed of the drive unit is prevented. In the invention, emergency running, is to be understood as the condition of the CVT in which no speed regulation and no regulation of applied pressure take place.

This development proposes that the adjusting means be a primary valve and a secondary valve. This solution according to the invention offers the advantage that in emergency running the CVT is not operated only with a single fixed ratio. In the solution according to the invention the ratio of the CVT varies depending on the generated torque of a drive unit such as an internal combustion engine. During emergency running the variable ratio change makes possible, for example, a safe starting on a mountain and an improved drive-ability with a high final speed. Another advantage of the solution according to the invention is that in said emergency running device no additional sensors or mechanical levers have to be used.

In another development of the invention it is proposed that the primary and secondary valves be pre-controlled by a first and second emergency valves and in development of this that a single electromagnetic pressure-regulating valve act as pre-control upon the first and second emergency valves. The advantage offered by this solution is that the first and second emergency valves are simultaneously engaged so that tolerances and signal running periods of the pressure-regulating valve have no effect.

BRIEF DESCRIPTION OF THE DRAWING(S)

One embodiment is shown in the drawings where:

DESCRIPTION OF THE PREFERRED EMBODIMENTS(S)

Figure 1:
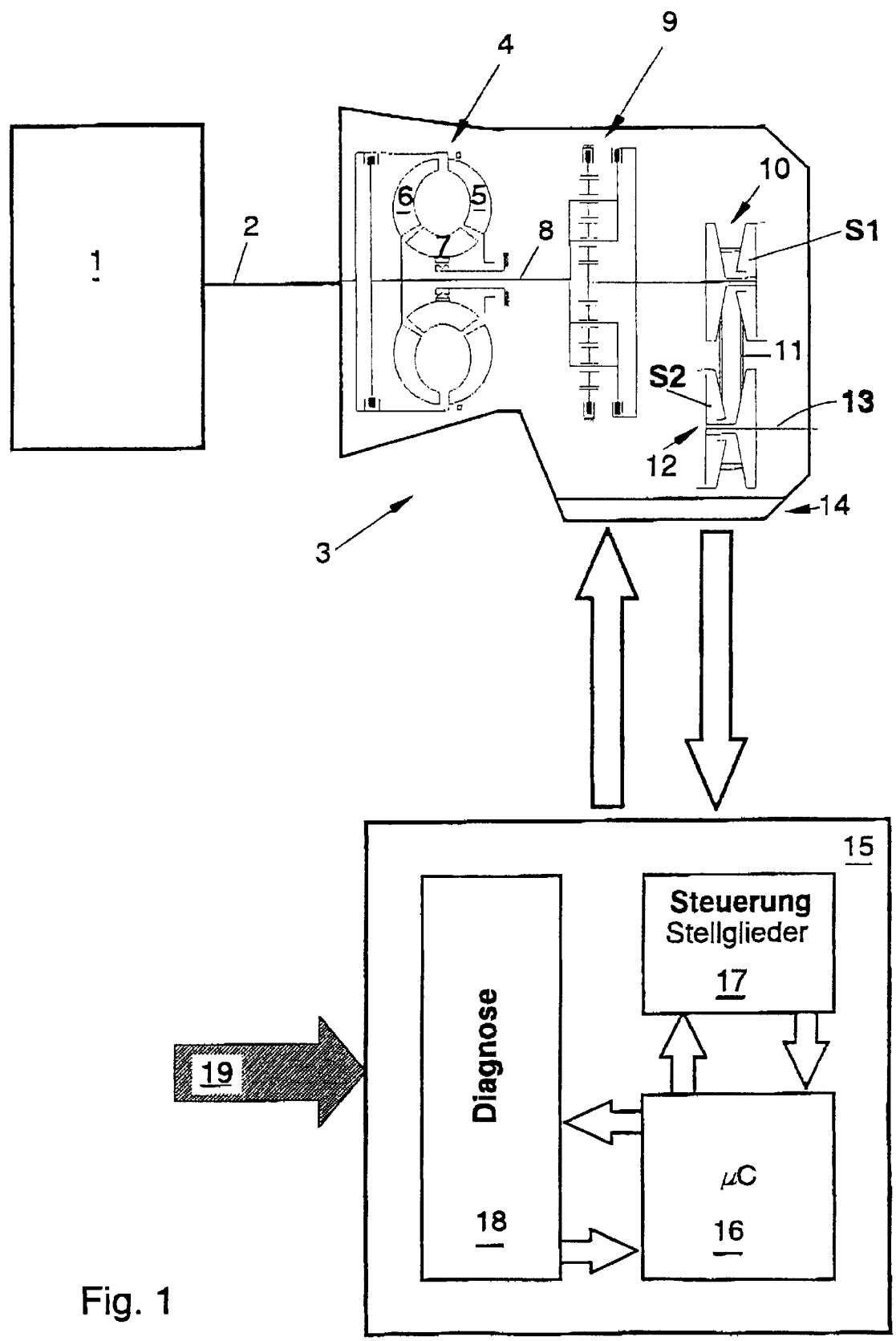
FIG. 1 is a block diagram of an electronically controlled continuously variable transmission.

One CVT 3 is shown in FIG. 1. The CVT 3 is connected by an input shaft 2 with a drive unit 1 such as an internal combustion engine or electromotor. The CVT 3 consists of the assemblies: hydrodynamic converter with bridge clutch 4, reversing mechanism 9, first cone-pulley pair 10, second cone-pulley pair 12, belt-drive organ 11 and hydraulic control device 14. The input shaft 2 drives the hydrodynamic converter 4. As known already, the latter consists of an impeller 5, a turbine wheel 6 and a stator 7. As shown in FIG. 1, a converter bridge clutch can be found in addition to the hydrodynamic converter 4. The turbine wheel 6 and converter bridge clutch are respectively connected with a transmission input shaft 8. The input shaft 8 drives a reversing mechanism 9. The speed of the transmission input shaft 8 is directly transmitted to the first cone-pulley pair 10 via the reversing mechanism 9 or a reversal of direction takes place for reverse gear. The core of the CVT 3 is constituted by the first cone-pulley pair 10, the second cone-pulley 12 and the belt-drive organ 11. The first cone-pulley pair 10 consists of the primary cone pulley S1, fixed stationary in axial direction and a second cone pulley movable in axial direction. The second cone-pulley pair 12 consists of a first cone-pulley stationary in axial direction and a second cone-pulley S2 movable in axial direction. The belt-drive organ 11 such as a sliding band extends between said cone-pulley pairs 10 and 12. The running radius of the belt-drive organ 11 changes as a result of the axial mobility of the primary pulley S1 or of the secondary pulley S2, thereby changing the speed of the transmission input shaft 8 or the ratio of the CVT 3. The output takes place via the output shaft 13.

The CVT 3 is controlled by an electronic control device 15 by means of electromagnetic actuators and hydraulic valves. The clutches and brakes and the pressure curves thereof are controlled by said actuators, not shown. The electromagnetic actuators and hydraulic valves are in a hydraulic control device 14. Shown as blocks of the electronic control device 15 are: a micro-controller 16, a function block control actuator 17 and a function block diagnostic device 18. Input parameters 19 are attached to the electronic control device 15. The input parameters 19 are, for example:

signal of a load position of the drive unit (in an internal combustion engine this corresponds to the throttle valve position), speed of a transmission input shaft, speed of the output shaft, and temperature of a pressure medium.

The electronic control device 15 determines an operating point from the input parameters 19 and adjusts the appertaining speed value of the transmission input shaft or the ratio of the CVT 3. The function block diagnostic device 18 checks the input parameters 19 for plausibility. If a serious error appears here, then the function block control actuator is usually deactivated by a security relay. The CVT 3 thus passes to emergency running. In the invention, emergency running is to be understood as the condition of the CVT in which no speed regulation and no contact-pressure regulation of the secondary pulley take place.

Figure 2:
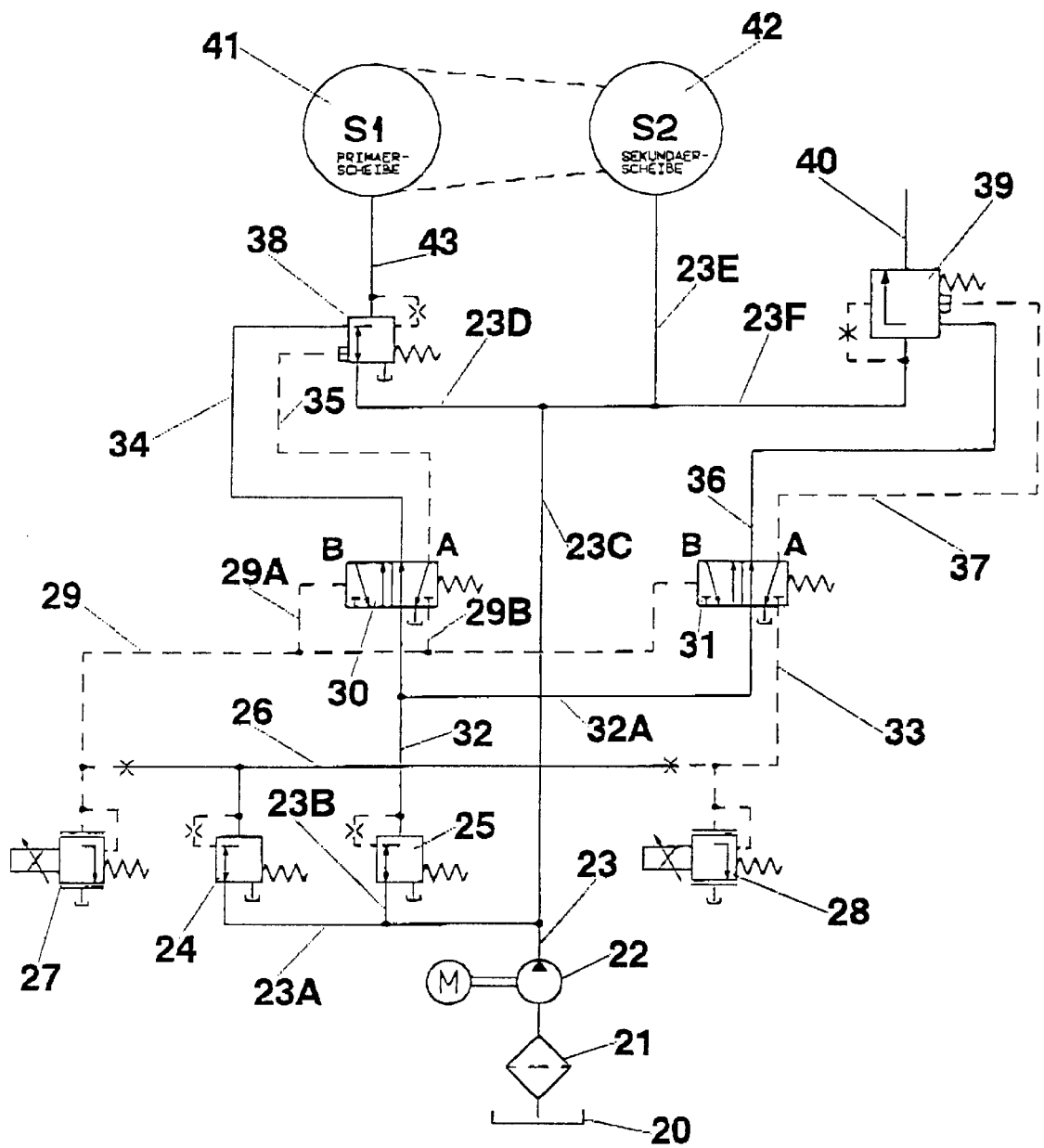
FIG. 2 is a hydraulic diagram of emergency running device.

FIG. 2 shows a hydraulic diagram of the emergency running device. A pump 22, driven by the drive unit 1 or by the impeller 5, conveys pressure medium from a lubricant sump 20, via a filter 21, into the pipe 23. The pipe 23 has a branch 23A to a first pressure-reducing valve 24 and a branch 23B to a second pressure-reducing valve 25. In addition, branching off from the pipe 23, is a pipe 23C with branches 23D to a primary valve 38, branch 23E to an adjustment space 42 of the secondary pulley S2 and branch 23F to a secondary valve 39. The pressure level of the pipe 23 with branches 23A to 23F is adjusted by the secondary valve 39 which is a pressure-limiting valve. The first pressure-reducing valve 24 adjusts the pressure in the pipe 26 to a constant value such as 6 bar. The second pressure-reducing valve 25 likewise controls the constant pressure in the pipe 32 and the branch 32A thereof. To the pipe 26 are attached a first electromagnetic pressure-regulating valve 27 and a second electromagnetic pressure-regulating valve 28. Via both pressure-regulating valves 27 and 28, the pressure in the respective pipes 29 and 33 can be linearly increased or reduced depending on the current value adjusted by the electronic control device 15. A first emergency valve 30 and a second emergency valve 31 are respectively connected with the pipe 29 and the branches 29A and 29B thereof. Both emergency valves, as shown, can be designed as separate parts and also be accommodated in a valve housing. The first pressure-regulating valve 27 acts as pre-control upon the first emergency valve 30, via the branch 29A, and upon the second emergency valve 31, via the pipe 29. Both emergency valves 30 and 31 have a first position A and a second position B. The first emergency valve 30 is connected with the primary valve 38, via pipes 34 and 35. The primary valve 38 is a pre-controlled pressure-reducing valve. The second emergency valve 31 is connected with the secondary valve 39, via pipes 36 and 37. The secondary valve 39 is a pressure-limiting valve for the secondary side, pipes 23 and 23A to 23F. When a pressure level in the pipe 33 is too high, the secondary valve 39 reduces the pressure level by the pressure medium being additionally fed via the pipe 40 to the other sinks of the CVT. The primary valve 38 adjusts via the pipe 43 the pressure level of the adjustment space 41 of the primary pulley S1. The belt-drive organ is shown by the dotted line. The operation of the arrangement is as follows: shown is the emergency operation. This means that the first and second pressure-regulating valves 27 and 28 are de-energized, causing a reduced pressure in the pipe 29 or 33, in comparison with the pipe 26, of 0.4 bar, for example. The spring of both emergency valves 30 and 31 is designed so that the compression force is stronger than the force from said reduced pressure. Both emergency valves are hereby, as shown, changed to the position A. Whereby the pipes 29B and 33 are closed. Thus, a passage prevails from the pipes 32 and 32A to the pipes 34 and 36. The constant pressure level of the second pressure-reducing valve 25 acts as pre-control pressure on the primary valve 38 and secondary valve 39. A constant pressure ratio is adjusted by primary valve 38 and secondary valve 39 in the adjustment spaces 41 and 42 of the primary pulley S1 and secondary pulley S2. The compression ratio is determined by testing, for example, 16.5 bar primary or to 26.0 bar secondary. Both emergency valves are in the position B in normal operation. Hereby the pipes 34 and 36 are vented in the tank. A passage exists from the pipe 29B to the pipe 35. A passage exists from the pipe 33 to the pipe 37. Hereby the pressure value adjusted by the first pressure-regulating valve 27 is transmitted as pre-control to the primary valve 38 and the pressure value adjusted by the second pressure-regulating valve 28 is transmitted as pre-control to the secondary valve 39. The ratio of the CVT is adjusted by the first pressure-regulating valve 27. The applied pressure of the secondary pulley is adjusted by the secondary pressure-regulating valve 28.

Figure 3:
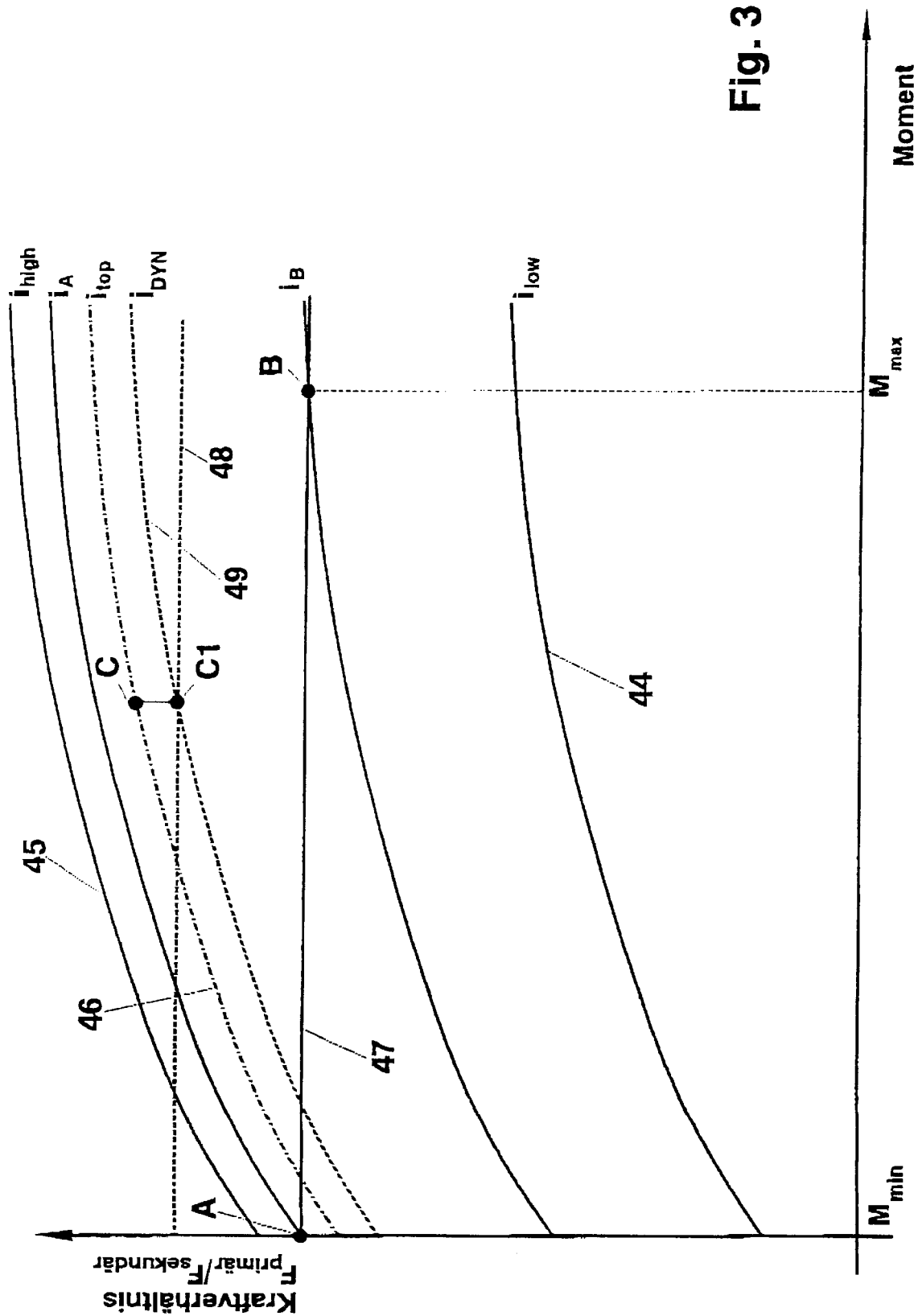
FIG. 3 is a performance graph.

FIG. 3 shows a performance graph. On the x-axis is plotted a torque of the primary pulley S1. The torque of the primary pulley S1 is calculated from the torque generated by the drive unit 1 multiplied by the ratio of the hydrodynamic converter 4. If an internal combustion engine, for example, is used as drive unit, it is known to calculate the torque generated from the two parameters: injection time and speed of the internal combustion engine. The power ratio is plotted on the y-axis. Power ratio is the quotient of power from the primary pulley to the power of the secondary pulley. The performance graph shows, depending on the torque, series of parabolic curves which correspond to the ratio of the CVT. The reference numeral 44 shows the lowest ratio i-low corresponding to the lowest gear and the reference numeral 45 shows the highest ratio i-high corresponding to the highest gear. That is the adjustment range of the CVT, between i-low and i-high, contains an infiniteseries of parabolic curves shifted in parallel. An example of such ratio is shown by the dotted line i-top marked with the reference numeral 46. The ratio i-top is usually selected so that a vehicle equipped with a drive unit and a CVT 3 reaches the maximum speed. The reference numeral 47 shows, shifted parallel to the x-axis, a line of a static power ratio of power of the primary pulley S1 to power of the secondary pulley S2. In the static power ratio, only the power from the action of the pressure medium is taken into consideration. Said static power ratio thus applies exclusively to dynamically pressure-balanced adjustment spaces 41 and 42 respective to the primary and secondary pulleys. The reference numeral 48 shows, shifted parallel to the x-axis, a dynamic power ratio of power of primary pulley S1 to power of secondary pulley S2. In the dynamic power ratio, a dynamic power component is added to the static power component. As known already, the pressure medium, according to speed, disperses in both adjustment chambers 41 and 42 as result of the centrifugal force. This results in an additional axial power component. The position of the line of the dynamic power ratio 48 is hereby likewise speed dependent. The dynamic power ratio thus results in not dynamically pressure-balanced adjustment spaces 41 and 42. The static power of the secondary pulley S2 is selected so that the belt-drive organ 11 can reliably transmit the torque to the secondary pulley S2 without slippage occurring. The static power adjusted in the secondary pulley S2 is constant over the whole range of the torque. Another criterion for the value of this power ratio is the necessity that with the transition from normal operation to emergency running, the speed of the drive unit should not rise so much as to cause damage to the drive unit. In the preferred embodiment, the two adjustment spaces 41 and 42 are not dynamically pressure-balanced. If a vehicle runs, for example, at maximum speed, that is, high speed level of the drive unit at the operating point C, with the transition to the emergency running, the ratio diminishes from i-top to the ratio i-dyn, reference numeral 49, of the new operating point C1. The line 47 has a limiting point A with appertaining torque M-min and a limiting point B with appertaining torque M-max. At the point A, the line 47 intersects the ratio line i-A and at point B the line 47 intersects the ratio line i-B. In emergency running, depending on the torque and on the dynamic power ratio, the ratio of the CVT now adjusts itself between said two limiting lines i-A and i-B as result of the constant power ratio. For example, emergency running could result in a CVT ratio ranging from 0.7 to 1.6.

In an elaboration, not shown, it is provided to use, instead of the second pressure-reducing valve 25, a pressure-reducing valve 25.1, said pressure-reducing valve 25.1 being dependent on the position of the secondary pulley S2. The position of the pulley can be detected, for example, by a mechanical connection. Depending on the position of the secondary pulley S2, the pressure-reducing valve 25.1 influences the secondary pressure, pipes 23F and 23E, via the secondary valve 39. The primary pressure, pipe 43, likewise can be influenced by the primary valve 38. By taking into consideration the position of the pulley, it is thus possible to keep constant the compression ratio pulley 1/pulley 2, but adapt it (ratio dependent) with regard to the absolute pressure level in accordance with the actual pressure requirement. Thereby improving the effectiveness of the variable drive in the emergency program.

| Reference numerals | |
|---|---|
| 1 | drive unit |
| 2 | input shaft |
| 3 | CVT |
| 4 | hydrodynamic converter with bridge clutch |
| 5 | impeller |
| 6 | turbine wheel |
| 7 | stator |
| 8 | transmission input shaft |
| 9 | reversing set |
| 10 | first cone-pulley pair |
| 11 | belt-drive organ |
| 12 | second cone-pulley pair |
| 13 | output shaft |
| 14 | hydraulic control device |
| 15 | electronic control device |
| 16 | micro-controller |
| 17 | function block control actuator |
| 18 | function block diagnosis |
| 19 | input parameters |
| 20 | lubricant sump |
| 21 | filter |
| 22 | pump |
| 23 | pipe |
| 23A | pipe |
| 23B | pipe |
| 23C | pipe |
| 23D | pipe |
| 23E | pipe |
| 23F | pipe |
| 24 | first pressure-reducing valve |
| 25 | second pressure-reducing valve |
| 25.1 | second pressure-reducing valve pulley-position dependent |
| 26 | pipe |

-continued

| Reference numerals | |
|---|---|
| 27 | first electromagnetic pressure-regulating valve |
| 28 | second electromagnetic pressure-regulating valve |
| 29 | pipe |
| 29A | pipe |
| 29B | pipe |
| 30 | first emergency valve |
| 31 | second emergency valve |
| 32 | pipe |
| 32A | pipe |
| 33 | pipe |
| 34 | pipe |
| 35 | pipe |
| 36 | pipe |
| 37 | pipe |
| 38 | primary valve |
| 39 | secondary valve |
| 40 | pipe |
| 41 | adjustment space primary pulley |
| 42 | adjustment space secondary pulley |
| 43 | pipe |
| 44 | ratio i-low |
| 45 | ratio i-high |
| 46 | ratio i-top |
| 47 | line of static power ratio, power primary to power secondary |
| 48 | line dynamic power ratio, power primary to power secondary |
| 49 | ratio i-dyn |
| S1 | primary pulley |
| S2 | secondary pulley |

We claim:

1. A device for controlling a continuously variable transmission (CVT) (3) driven by a drive unit (1) having a first cone-pulley (10) on an input shaft and a second cone-pulley (12) on an output shaft and a drive-belt (11) which rotates about said first and second cone-pulleys to transmit drive therebetween;

wherein said first cone-pulley (10) comprises a first fixed pulley cone, fixed axially relative to the input shaft and a first movable pulley cone (S1) movable axially to adjust a spacing between the first fixed and first movable cones, said second cone-pulley (12) comprises a second fixed pulley cone fixed axially relative to said output shaft and a second movable pulley cone (S2) movable axially to adjust a spacing between the second fixed and second movable cones, an electronic device (15), which via electromagnetic actuator controlled hydraulic valves, determines a magnitude of said spacings and a hydraulic emergency running unit is activated upon breakdown of said electronic control device (15) to provide a desired ratio of said spacings to maintain a desired pressure on said drive belt by said first and second cone pulleys.

2. A device according to claim 1, wherein said emergency running unit comprises a primary valve (38) and a secondary valve (39).

3. A device according to claim 2, wherein said primary and secondary valves (38, 39) are controlled by first and second emergency valves (30, 31) respectively.

4. A device according to claim 3, wherein an electromagnetic pressure-regulating valve (27) controls said first and second emergency valves (30, 31).

5. A device for controlling a continuously variable transmission (CVT) (3) driven by a drive unit (1) having a first cone-pulley (10) on an input shaft and a second cone-pulley (12) on an output shaft and a drive-belt (11) which rotates about said first and second cone-pulleys to transit drive therebetween:

wherein said first cone-pulley (10) comprises a first fixed cone, fixed axially relative to the input shaft and a first movable pulley cone (S1) movable axially to adjust a spacing between the first fixed and first movable cones. said second cone-pulley (12) comprises a second fixed pulley cone fixed axially relative to said output shaft and a second movable pulley cone (S2) movable axially to adjust a spacing between the second fixed and second movable cones, an electronic device (15) which via electromagnetic actuator controlled hydraulic valves determines a magnitude of said spacings and a hydraulic emergency running unit is activated upon breakdown of said electronic control device (15) to provide a desired ratio of said spaces to maintain a desired pressure on said drive belt by said first and second cone pulleys; and said hydraulic emergency running unit comprises first and second pressure-reducing valves (24, 25) which act to control output pressure from a pump (22), first and second electromagnetic pressure-regulating valves (27, 28) connected to be operated by said first pressure-reducing valve (24), said first electromagnetic pressure-regulating valve (27) is connected to operate first and second emergency valves (30, 31), said first emergency valve (30) being connected to operate primary valve (38), said second emergency valve (31) being connected to operate secondary valve (39), said primary valve (38) and said secondary valve (39) being connected to receive output from said pump (22), the pressure level for said adjustment of said second pulley cone being determined by said secondary valve (39), said primary valve (38) determines the pressure level for said adjustment of said first pulley cone, said second pressure-reducing valve (25) is connected to both emergency valves (30, 31), the switching positions of said first and second emergency valves (30, 31) are determined by said first electromagnetic pressure-regulating valve (27) so that in a first position (B) of both emergency valves (30, 31), said first pressure-regulating valve (28) acts to control said secondary valve (39), and in a second position (A) of both emergency valves (30, 31), the pressure level of said pressure-reducing valve (25) acts to control said primary valve (38) and said secondary valve (39).

6. A device according to claim 5, wherein operation of said second pressure-reducing valve (25) is dependent on the adjustment position of said second pulley cone and is connected with both emergency valves (30, 31).

7. A device according to claim 6, wherein operation of said second pressure-reducing valve (25) is dependent on the position of said second pulley and controls the adjustment of both cone pulleys (10, 12).

8. A device for controlling a continuously variable transmission (CVT), said CVT consisting of a primary cone pulley on an input shaft and a secondary cone pulley on an output shaft, said pulleys being adjustable to vary the running diameter about the pulleys of a belt connecting the pulleys;

a control device for controlling the adjustment of the pulleys; and a hydraulic emergency running unit which, upon failure of said control device, is activated to control the adjustment of said pulleys.

9. A device according to claim 8, wherein said control device is electronic and controls primary and secondary valves which adjust the pulleys.

10. A device according to claim 9, whereby failure of said electronic control device activates said emergency running unit which controls said pulleys by hydraulic means to maintain a belt driving relationship between the pulleys.

11. A device according to claim 10, whereby said primary and secondary values are controlled by first and second emergency values, said emergency values each having operating positions A and B, respectively.

12. A device according to claim 11, wherein said hydraulic means comprises:

a pump first and second pressure reducing valves connected to said pump;

first and second electromagnetic pressure regulating valves connected to said first and second pressure reducing valves;

said first electromagnetic pressure regulating valve being connected to said first and second emergency valve;

said second electromagnetic pressure regulating valve also being connected to said first and second emergency valve;

said first emergency valve being connected to said primary valve and said second emergency valve being connected to said secondary valve; and said primary and secondary valves also being connected directly to said pump.

13. A device according to claim 12, wherein a pressure level adjusting the secondary pulley is controlled by said secondary value and a pressure level adjusting the primary pulley is controlled by said primary value;

said emergency values switching positions A and B are determined by said respective electromagnetic pressure-regulating values such that;

in position B, a normal operating mode, said first electromagnetic pressure regulating value acts as to control said primary value and second electromagnetic pressure regulating value acts as to control said secondary value; and in position A, an emergency running mode, said primary pressure reducing value acts as to control said primary and secondary values.

* * * * *